(12) United States Patent  
Junge et al.

(10) Patent No.: US 9,239,476 B2
(45) Date of Patent: Jan. 19, 2016

(54) LAYER ARRANGEMENT FOR THE REGULATION OF LIGHT TRANSMISSION

(75) Inventors: Michael Junge, Pfungstadt (DE); Andreas Beyer, Hanau (DE)

(73) Assignee: Merck Patent GmbH, Darmstadt (DE)

( * ) Notice: Subject to any disclaimer, the term of this patent is extended or adjusted under 35 U.S.C. 154(b) by 116 days.

(21) Appl. No.: 13/982,378

(22) PCT Filed: Jan. 4, 2012

(86) PCT No.: PCT/EP2012/000024
§ 371 (c)(1),
(2), (4) Date: Jul. 29, 2013

(87) PCT Pub. No.: WO2012/100902
PCT Pub. Date: Aug. 2, 2012

(65) Prior Publication Data
US 2013/0308069 A1    Nov. 21, 2013

Related U.S. Application Data

(60) Provisional application No. 61/443,453, filed on Feb. 16, 2011.

(30) Foreign Application Priority Data

Jan. 28, 2011    (DE) .......................... 10 2011 009 690
Mar. 4, 2011    (GB) .................................. 1103723.1

(51) Int. Cl.
*G02F 1/1335*    (2006.01)
*G02F 1/01*    (2006.01)
(Continued)

(52) U.S. Cl.
CPC ................. *G02F 1/0147* (2013.01); *B60J 3/06* (2013.01); *E06B 9/24* (2013.01); *G02F 1/132* (2013.01);
(Continued)

(58) Field of Classification Search
CPC ..................... G02F 1/133528; G02F 1/133536
USPC .......................................................... 349/96
See application file for complete search history.

(56) References Cited

U.S. PATENT DOCUMENTS 6,218,018 B1    4/2001    McKown et al.
7,410,685 B2    8/2008    Rosenberger et al.
(Continued)

FOREIGN PATENT DOCUMENTS

CN    1263874 A    8/2008
CN    101802679 A    8/2010
(Continued)

OTHER PUBLICATIONS

International Search Report for PCT/EP2012/000024, Date of the actual completion of the international search: Apr. 13, 2012, Date of mailing of the international search report: Apr. 25, 2012.
(Continued)

*Primary Examiner* — Phu Vu
(74) *Attorney, Agent, or Firm* — Millen, White, Zelano & Branigan, P.C.

(57) ABSTRACT

The present invention relates to a layer arrangement which changes the transmission of light depending on its temperature, where the layer arrangement has a first polarization layer, a switching layer which influences the polarization properties of light depending on the temperature, and a second polarization layer, as well as an additional NIR transmission-preventing layer.

17 Claims, 7 Drawing Sheets

(51) Int. Cl.
*E06B 9/24* (2006.01)
*B60J 3/06* (2006.01)
*G02F 1/13* (2006.01)
G02B 5/20 (2006.01)
G02B 27/28 (2006.01)
G02F 1/139 (2006.01)

(52) U.S. Cl.
CPC .... *G02F 1/133528* (2013.01); *G02F 1/133536* (2013.01); *G02B 5/208* (2013.01); *G02B 27/281* (2013.01); *G02F 1/1396* (2013.01)

(56) References Cited

U.S. PATENT DOCUMENTS

| | | |
|---|---|---|
| 7,755,829 B2 | 7/2010 | Powers et al. |
| 8,072,672 B2 | 12/2011 | Powers et al. |
| 8,755,105 B2 | 6/2014 | Powers et al. |
| 2003/0215627 A1 | 11/2003 | Rosenberger et al. |
| 2005/0117193 A1 | 6/2005 | Poll et al. |
| 2008/0210893 A1 | 9/2008 | McCarthy et al. |
| 2009/0015902 A1 | 1/2009 | Powers et al. |
| 2009/0167971 A1* | 7/2009 | Powers et al. ............ 349/18 |
| 2010/0271686 A1 | 10/2010 | Powers et al. |
| 2010/0288947 A1 | 11/2010 | McCarthy et al. |
| 2011/0042771 A1* | 2/2011 | Huang et al. ............ 257/437 |
| 2011/0094585 A1 | 4/2011 | Debije et al. |
| 2011/0102878 A1 | 5/2011 | McCarthy et al. |
| 2012/0140311 A1 | 6/2012 | Powers et al. |
| 2013/0155338 A1 | 6/2013 | Junge |
| 2013/0278989 A1* | 10/2013 | Lam et al. ............ 359/275 |

FOREIGN PATENT DOCUMENTS

| | | |
|---|---|---|
| DE | 37 21 353 | 1/1989 |
| EP | 1 363 141 | 11/2003 |
| EP | 2 423 294 | 2/2012 |
| WO | WO-2009 141295 | 11/2009 |
| WO | WO-2011 053853 | 5/2011 |

OTHER PUBLICATIONS

Bauer Rainer, Clear, translucent planar body, for example window glass, mirror glass or spectacle glass, glare protection film of the like and method for its production.

* cited by examiner

LAYER ARRANGEMENT FOR THE REGULATION OF LIGHT TRANSMISSION

The present invention relates to a layer arrangement which changes the transmission of light depending on its temperature, where the layer arrangement has a first polarisation layer, a switching layer which influences the polarisation properties of light depending on the temperature, and a second polarisation layer, as well as an additional NIR transmission-preventing layer.

The layer arrangement can be used in accordance with the invention in or on windows or comparable openings to building interiors, such as, for example, glazed doors. Furthermore, the layer arrangement can be employed in or on walls or roofs.

For the purposes of this invention, the term interior is intended to be taken to mean both interiors of private, public or commercial buildings or those used for office purposes as well as interiors of vehicles. Furthermore, it is intended to be taken to mean any desired large receptacles, for example shipping containers. Furthermore, the term window in the sense of this invention is intended to be taken to mean any desired openings in buildings or vehicles which are transparent to light and are sealed with solid material.

The term incident light in the sense of this invention is taken to mean the flow of electromagnetic radiation which emanates from the sun, hits the earth after passing through the atmosphere and is only absorbed to a slight extent, or not at all, by uncoated glass sheets, so that incident light coming from the sun can pass through glass sheets into an interior. Since short-wave UV radiation (UV-B light) and long-wave infrared radiation is absorbed by the atmosphere or by glass sheets, incident light accordingly essentially encompasses a long-wave UV radiation region (UV-A light), electromagnetic radiation in the visible region (VIS light) and the short-wave infrared radiation region (NIR light).

According to definitions usually used in the area of optics, UV-A light is for the purposes of the present application taken to mean, in particular, light having a wavelength of 320 to 380 nm, VIS light is taken to mean, in particular, light having a wavelength of 380 to 780 nm, and NIR light is taken to mean, in particular, light having a wavelength of 780 to 3000 nm.

For the purposes of the present application, an NIR transmission-preventing layer is taken to mean a layer which reduces to a significant extent the intensity of the NIR light passing through it. There is preferably a specificity of transmission prevention for NIR light compared with VIS light. Particularly preferred properties and embodiments of the NIR transmission-preventing layer are described in following sections.

Modern buildings are distinguished by a high proportion of glass surfaces, which is highly desired both for aesthetic and architectural reasons and also with respect to the brightness and comfort of the interiors. It has become equally important in recent years that buildings which are used for living or office purposes and/or are accessible to the public should have the highest possible energy efficiency. This means that in temperate climatic zones, as little energy as possible should be used for heating purposes in the cold season and no or only little air conditioning of the interiors should be necessary in the warm season. However, extensive glass surfaces are counterproductive in achieving these aims.

On the one hand, glass surfaces result in undesired heating of the interiors in the case of warm outside temperatures if intense insolation is additionally present, since they are transparent to radiation in the VIS and NIR regions of the electromagnetic spectrum. Objects in the interior absorb the radiation allowed through and are thereby warmed, which results in an increase in the room temperature (greenhouse effect).

On the other hand, a second negative effect of large window areas becomes noticeable in the case of low outside temperatures: they have high emissivity.

Emissivity or degree of emission is taken to mean the property of a material to emit electromagnetic radiation. Materials having low emissivity (for example metal surfaces) reflect the majority of the radiation hitting them, while materials having high emissivity (glass and in particular dark bodies) absorb and emit the majority of the radiation. In accordance with physical radiation laws, the absorbed or emitted radiation is predominantly radiation in the infrared region.

Standard window glass, which has high emissivity, absorbs the majority of the infrared radiation coming from the warm interior and re-emits the majority thereof. Heat is thereby emitted into the environment, and in the case of low outside temperatures, heat is thus permanently released to the cold environment.

With the increasing importance of energy efficiency of buildings, there is a growing demand for special devices or coatings arranged directly on window surfaces which control the energy flow through the windows. With respect to low production and operating costs and low space requirement, suitable coatings are advantageous. In particular, there is a demand for coatings which are able to match the energy flow through windows in a suitable manner to the conditions prevailing at the particular point in time (heat, cold, high insolation, low insolation).

The prior art discloses both non-switchable coatings (layer arrangements), which limit the energy flow, but are unable to adapt it in a variable manner, and also switchable coatings, which are able to match the energy flow to the respective conditions prevailing. Amongst the switchable devices, a distinction can be made between coatings which do not adapt automatically to the ambient conditions and coatings which do adapt automatically to the ambient conditions. Windows having the latter coatings are also known as intelligent windows (smart windows).

In order to improve the thermal insulation of windows, multiglazed window units (multipane insulating glass, insulated glass units) have been known for some time. The sequence of two or more glass sheets enclosing one or more gas-filled cavities insulated from the environment enables the thermal conduction through windows to be reduced significantly compared with single glass panes.

The prior art furthermore discloses the coating of window panes with thin metal or metal-oxide layers. The production of glass coated in this way is disclosed, for example, in U.S. Pat. No. 3,990,784 and U.S. Pat. No. 6,218,018, inter alia. In many cases, this technique is employed in multipane insulating glass windows and additionally improves the thermal-insulating properties of these windows.

The coating can regulate the flow of radiation energy in two ways: on the one hand it reduces the transmissivity of the glass for light and thus the heating of glazed rooms in the case of intense insolation, and on the other hand it reduces the emissivity of the glass panes, so that less heat is emitted to the outside in the heating period.

If the flow of radiation energy is controlled exclusively by the coating technique presented, no adaptation to varying weather or seasonal conditions is possible. For example, it would be of interest for windows to be totally transparent to incident sunlight in the cold season in order to reduce the energy expenditure for heating. Conversely, low emissivity of the windows is unnecessary or disadvantageous in the case of warm outside temperatures, since the greenhouse effect described above is thus augmented.

There is therefore a demand for coatings in which the flow of radiation energy can be matched to the respective conditions prevailing. In particular, there is a demand for coatings which arte able to adapt automatically to the ambient conditions.

The prior art discloses coatings which can be switched reversibly from a transparent state to a less-transparent, for example opaque, or substantially non-transparent state on application of an electrical voltage.

An example of such coatings is electrochromic devices, which are presented, inter alia, in Seeboth et al., Solar Energy Materials & Solar Cells, 2000, 263-277.

Furthermore, U.S. Pat. No. 7,042,615 and U.S. Pat. No. 7,099,062 describe electrochromic coatings in which the switching between a transparent state and a non-transparent state is effected by the application of a voltage and the ion migration caused thereby.

Further electrically controllable coatings known from the prior art for the control of the flow of radiation energy are coatings based on suspended particles (suspended particle devices, SPDs), for example particles of organic polyiodides, which align in an electric field (U.S. Pat. No. 4,919,521).

Further electrically controllable coatings known from the prior art are based on the alignment of the molecules of a liquid-crystalline medium on application of an electric field. Such coatings are disclosed, inter alia, in U.S. Pat. No. 4,268,126, in U.S. Pat. No. 4,641,922 and in U.S. Pat. No. 5,940,150 and are based, inter alia, on the dynamic light-scattering effect of liquid-crystalline media (dynamic light scattering).

A review of various electrically controllable coatings for the control of the flow of radiation energy through windows is given, inter alia, in the above-mentioned publication by Seeboth et al. and in C. M. Lampert, Solar Energy Materials & Solar Cells, 2003, 489-499.

Although the coatings mentioned enable adjustment of the flow of radiation energy, they have, however, the disadvantage that they have to be electrically controlled. The introduction of electrical components, such as, for example, power supplies and control devices, into windows is accompanied by additional costs in the production of the windows and entails the risk of susceptibility to faults and the low durability of coatings of this type. Furthermore, significant construction effort is necessary in many cases to achieve an electrical connection of the windows.

US 2009/0015902 and US 2009/0167971 disclose layer arrangements which have a switching layer between two polarisation layers, where the switching layer rotates the plane of polarisation of the incident light at a first temperature and only rotates the plane of polarisation of the incident light insignificantly or not at all at a second temperature. Through a permanent rotation of the planes of polarisation of the polarisation layers with respect to one another, it can thus be achieved that the layer arrangement allows more incident light to pass through at the first temperature than at the second temperature. The two temperature-dependent states are referred to below as the transparent state and the non-transparent state respectively.

In particular, these two applications US 2009/0015902 and US 2009/0167971 disclose layer arrangements in which a twisted nematic cell (TN cell) is used. In this case, the switching between the transparent state and the non-transparent state is achieved by a phase transition of the liquid-crystalline medium, which is located in the twisted nematic cell, from a nematic state at a temperature below the clearing point to an isotropic state above the clearing point.

In the nematic state, the liquid-crystalline medium of the switching layer rotates the plane of polarisation of the light through a definable twist angle. Furthermore, the planes of polarisation of the polarisation layers are rotated through a defined angle with respect to one another, which remains unchanged during the switching operation. If the angle through which the liquid-crystalline medium of the switching layer rotates the plane of polarisation of polarised light corresponds to the angle through which the planes of polarisation of the polarisation layers are rotated with respect to one another, the light passing through the first polarisation layer and the switching layer can also pass through the second polarisation layer. The transparent state of the layer arrangement therefore arises when the nematic state of the liquid-crystalline medium of the switching layer arises. Since the nematic state exists at temperatures below the clearing point, the transparent state of the layer arrangement arises at lower temperatures in relative terms.

In the isotropic state, the liquid-crystalline medium of the switching layer does not rotate the plane of polarisation of the light, meaning that the latter cannot pass through the two polarisation layers, whose planes of polarisation are rotated with respect to one another. The less-transparent state of the layer arrangement therefore arises when the isotropic state of the liquid-crystalline medium of the switching layer arises. Since the isotropic state exists at temperatures above the clearing point, the less-transparent state of the layer arrangement arises at higher temperatures relative to the transparent state.

Investigations which have resulted in the present invention have now shown that the influence which can be achieved with a layer arrangement of this type on the incident light cannot meet all requirements usually arising, in particular in temperate and warm climatic regions.

It is therefore regarded as an object of the present invention to design a layer arrangement of the generic type mentioned at the outset in such a way that the properties which are effective for control of heat transmission are improved.

This object is achieved in accordance with the invention by the provision of a layer arrangement which changes the transmission of incident light depending on its temperature, where the layer arrangement has a first polarisation layer, a switching layer which influences the polarisation properties of light depending on the temperature, a second polarisation layer, and additionally at least one NIR transmission-preventing layer.

In a preferred embodiment, the switching layer comprises a liquid-crystalline medium which forms a nematic phase in a first temperature range and forms an isotropic phase in a second temperature range.

In a particularly preferred embodiment, the switching layer of the layer arrangement is a twisted nematic liquid-crystalline layer. It is furthermore preferred for the polarisation layers to polarise light in a linearly manner.

According to a further preferred embodiment, the layer arrangement has been applied to a glass sheet or acrylic glass sheet as substrate layer (5).

According to a further preferred embodiment, the device is purely temperature-controlled and is not electrically switchable. In accordance with this preferred embodiment, the device does not contain any electrical connections, electrodes and/or electrical leads.

It has been found that, owing to the properties of the polarisation layers and switching layers which are currently available and which can be employed in an economically sensible manner, a considerable proportion of the NIR light remains substantially unpolarised and is able to pass through the layer arrangement substantially unhindered, irrespective of the state of the switching layer, and accordingly is able to enter the interior and heat the interior. An extension of the switching action of the switching layer to NIR light or the polarisation action of the polarisation layers involved to the NIR region would be associated with considerable costs and in some cases severe restrictions. However, it has been found that temperature-dependent influencing of the incident light in the NIR region is not necessary for the vast majority of applications.

A suitable layer which at least partially reflects or absorbs, in particular, radiation in the NIR region and at the same time has as little effect as possible on radiation in the VIS region enables the NIR content of the incident light to be reduced during transmission without the otherwise necessary polarisation of the radiation in the NIR region and influencing by the switching layer being necessary.

In contrast to the suggestions from the prior art to change the transmission properties of the layer arrangement in a uniform manner over the entire wavelength range and/or in particular in the VIS region of sunlight as a function of temperature, the NIR region of the incident radiation is influenced specifically in a constant manner and the transmission of NIR radiation through the layer arrangement is significantly reduced in accordance with the invention by combination with a frequently inexpensive NIR transmission-preventing layer.

Since a significant proportion of heat is transmitted by light having wavelengths in the NIR region, it is provided in an advantageous manner that the reduction in the transmission in the transparent state by the layer arrangement is greater by a factor of more than 2, preferably more than 2.08, particularly preferably more than 2.2 and very particularly preferably more than 2.3 in the NIR region than the reduction in the transmission in the VIS region. The NIR transmission-preventing layer basically reflects a large proportion of the light having wavelengths in the NIR region, or prevents it from passing through the layer arrangement, so that this proportion of the light cannot contribute to undesired warming of the interior. Since this wavelength range cannot be perceived visually, there is no need to fear any disadvantageous effects on the optically perceptible properties of the layer arrangement. Combination of an NIR transmission-preventing layer which is effective in this way, which does not have to be temperature-dependent and is therefore commercially available inexpensively, enables the overall efficiency of the layer arrangement to be considerably improved in a simple manner and at the same time the comfort in the interior which is influenced by the perceptible content of the incident sunlight to remain substantially unchanged.

According to a preferred embodiment of the inventive idea, it is provided that the NIR transmission-preventing layer be arranged on an outside of the layer arrangement facing the incident light. In this way, it is avoided that the NIR content of the incident light firstly passes unhindered through the polarisation layers and switching layer and warms them in the process, before being reflected by the NIR transmission-preventing layer and passing through the polarisation layers and switching layer again and warming them again. The temperature-dependent change between the transparent state and the non-transparent state of the layer arrangement is accordingly predominantly dependent on the temperature prevailing in the interior and is less dependent on the outside temperature or the intensity of the incident sunlight.

It is likewise conceivable in accordance with an alternative embodiment of the inventive idea and is advantageous for some applications for the NIR transmission-preventing layer to be arranged on an outside of the layer arrangement facing away from the incident light. Since the NIR content of the incident light reflected by the NIR transmission-preventing layer passes through the polarisation layers and switching layer twice and warms them in the process, the change between the transparent state and the non-transparent state of the layer arrangement is more dependent on the intensity of the incident light than in the case of the layer structure outlined above. The suitable arrangement of the NIR transmission-preventing layer relative to the polarisation layers and the switching layer located in between can optionally be prespecified for each application or for the respective climatic conditions prevailing.

Alternatively or additionally, further aspects may be taken into account for the arrangement of the NIR transmission-preventing layer which is advantageous in each individual case. Thus, for example, a more light-stable layer of this type could be arranged on an outside of the layer arrangement facing the incident light in order to screen the less light-stable polarisation layers better against the incident light and to protect them against fading. However, if the NIR transmission-preventing layer used is less light-stable than the polarisation layers used, it could be arranged on an outside of the layer arrangement facing away from the incident light for protection against fading.

It has proven advantageous for the NIR transmission-preventing layer to have at least one layer comprising a cholesteric liquid-crystal material. In particular in the case of the use of a plurality of layers comprising a cholesteric (chiral nematic) liquid-crystal material, high reflection values for NIR radiation and at the same time good transmission of VIS radiation can be achieved. For example, band-broadened cholesteric reflectors, as are described in principle, for example, in U.S. Pat. No. 6,099,758, whose main reflection is arranged in the NIR region are conceivable and suitable. Likewise suitable are layers having a helix pitch which increases or decreases over the course of the layers.

According to another embodiment of the inventive idea, it is provided that the NIR transmission-preventing layer has at least one layer comprising a ceramic material. Ceramic coatings are already known from various areas of application, meaning that established coating methods which are suitable for mass production exist. In addition to increased reflection of NIR radiation, improved surface coating or abrasion resistance of the layer arrangement can be achieved and ensured over a long period.

It is likewise conceivable and advantageous with respect to low production costs for the NIR transmission-preventing layer to have at least one layer comprising a metallic material.

It is furthermore provided in accordance with an embodiment of the inventive idea that the NIR transmission-preventing layer has at least one layer comprising a dye. The dye-containing layer preferably comprises one or more dyes, which are able to absorb, in particular, light in the NIR region.

A combination of various layers described above which is advantageous in a number of respects consists in that the NIR transmission-preventing layer has a combination of a layer comprising a metallic material with a layer comprising a dye.

The NIR transmission-preventing layer can be applied with the aid of a thin-film process or a printing process.

Depending on the structure and composition of the layer, it may be advantageous for the layer to be applied by sputtering or pyrolytic spraying. The application of metallic or metal oxide-containing layers by means of sputtering and pyrolytic spraying is already known from other areas of application and, for example, in the production of heat-insulating glass panes.

It has been found that a multiple layer sequence of metal layers and metal-oxide layers arranged and applied in a suitable manner can have particularly good transmission-preventing properties in the NIR region. The NIR transmission-preventing layer preferably consists of a sequence of three to five metal-oxide layers and metal layers arranged alternately. However, more layers may also be present.

It likewise corresponds to a preferred embodiment of the invention for the NIR transmission-preventing layer to be applied by thermal vapour deposition.

According to a further embodiment of the inventive idea, the NIR transmission-preventing layer (4) consists of an NIR-reflective film or foil having a multilayered structure, where the individual layers typically consist of at least two materials having a different refractive index. NIR-reflective films of this type are described, for example, in U.S. Pat. No. 7,236,296 B2 or are available, for example, under the name "Prestige PR 70" from 3M.

According to a further embodiment of the inventive idea, the NIR transmission-preventing layer (4) is a NIR polarizer, preferably a NIR polarizing foil. The NIR polarizer may be partially polarizing in the NIR part of the spectrum. Any known NIR polarizing foil can be used, e g. the polarizers disclosed in U.S. Pat. No. 5,882,774 A.

Some illustrative embodiments are explained in greater detail below and are depicted in the drawings, in which:

FIG. 1 shows a diagrammatic sectional view through a layer arrangement according to the invention, FIG. 2 shows a diagrammatic sectional view through a layer arrangement according to the invention which is arranged on a surface of a glass sheet, FIG. 3 shows a diagram with the results of spectral measurements of the transmission properties in the transparent state in a layer arrangement in accordance with an already known prior art (twisted nematic cell having reflective or absorptive polarisers), where curve 1 shows the transmission with reflective polarisers, and curve 2 shows the transmission with absorptive polarisers, FIG. 4 shows a diagram with the results of spectral measurements of the transmission properties relating to linearly polarised light of an absorptive polariser in accordance with the prior art, where the spectrum labelled 1 shows the transmission of light polarised parallel to the plane of polarisation of the polariser, and the spectrum labelled 2 shows the transmission of light polarised perpendicular to the plane of polarisation of the polariser, FIG. 5 shows a diagram with the results of spectral measurements of the transmission properties of a layer arrangement according to the invention in the transparent state using a commercially available insulating glass pane having a heat-protection coating, where the spectrum labelled 1 shows the transmission on use of absorptive polarisers, and the spectrum labelled 2 shows the transmission on use of reflective polarisers, FIG. 6 shows a diagram with the results of spectral measurements of the transmission properties in the transparent state of a layer arrangement according to the invention which comprises a commercially available heat-protection film with a metallic coating, where the spectrum labelled 1 shows the transmission on use of absorptive polarisers, and the spectrum labelled 2 shows the transmission on use of reflective polarisers, FIG. 7 shows a diagram with the results of spectral measurements of the transmission properties in the transparent state of a layer arrangement according to the invention which comprises a commercially available heat-protection film with a ceramic coating, where the spectrum labelled 1 shows the transmission on use of absorptive polarisers, and the spectrum labelled 2 shows the transmission on use of reflective polarisers, FIG. 8 shows a diagram with the results of spectral measurements of the transmission properties of a layer arrangement according to the invention in the transparent state which comprises an NIR reflection film, where the spectrum labelled 1 shows the transmission on use of absorptive polarisers, and the spectrum labelled 2 shows the transmission on use of reflective polarisers.

Figure 1:
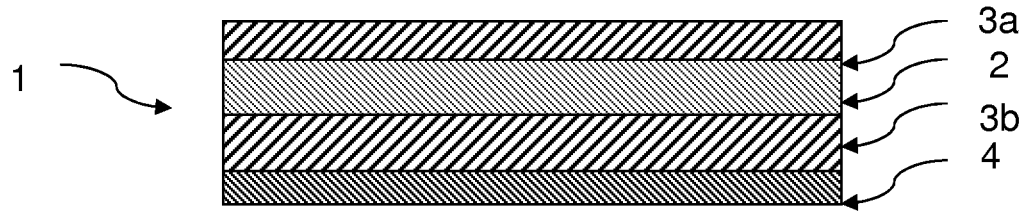
FIGS. 1 and 2 show diagrammatically and by way of example possible embodiments of a layer arrangement (1) according to the invention.

The layer arrangement (1) shown in FIG. 1 has a switching layer (2) which influences the polarisation properties of light depending on the temperature. The switching layer (2) preferably comprises a liquid-crystalline medium which forms a nematic phase in a first temperature range and forms an isotropic phase in a second temperature range. The arrangement comprising the two polarisation layers (3a) and (3b) and the switching layer (2) is particularly preferably a twisted nematic cell.

The polarisation properties of a light beam passing through the switching layer are influenced in different ways depending on the temperature. Depending on the composition and structure of the switching layer (2), a first, lower temperature range exists in which the polarisation properties of light are changed by the switching layer (2), and a second, higher temperature range exists in which the polarisation properties of light are only changed slightly or not at all.

A polarisation layer (3a) or (3b) is arranged on each of the two sides of the switching layer (2) and essentially transmits exclusively light having a prespecified polarisation and either reflects (reflective polarisation layers) or absorbs (absorbent polarisation layers) light having a different polarisation. The planes of polarisation of the two polarisation layers (3a) and (3b) are, in accordance with a preferred embodiment, rotated through a certain angle with respect to one another, so that the plane of polarisation of light which is prespecified by the first polarisation layer (3a) is rotated by the switching layer (2) at a first temperature, and the light can therefore subsequently pass through the second polarisation layer (3b) essentially unhindered (transparent state), while the switching layer (2) does not change the plane of polarisation of light at a second temperature, and the light can therefore hardly pass through the second polarisation layer (3b) or cannot pass through it at all (non-transparent state).

In accordance with a preferred embodiment, a liquid-crystalline state, particularly preferably a nematic state, of the liquid-crystalline medium which is present in the switching layer exists at the first temperature. In accordance with a preferred embodiment, an isotropic state of the liquid-crystalline medium which is present in the switching layer exists at the second temperature.

Figure 2:
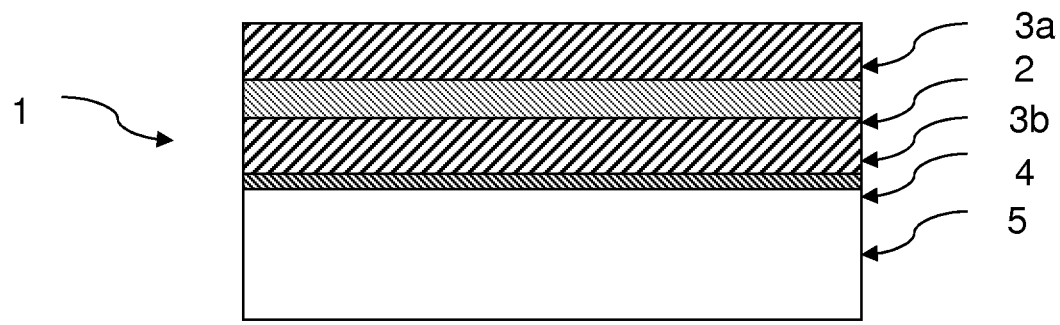

In addition to the polarisation layers (3a) and (3b) and the switching layer (2), the layer arrangement (1) depicted by way of example in FIGS. 1 and 2 has an NIR transmission-preventing layer (4). The NIR transmission-preventing layer (4) is preferably and, in the two illustrative embodiments shown, in each case arranged on an outside of the polarisation layer (3a), switching layer (2) and polarisation layer (3b) layer sequence, but could also be positioned within the layer arrangement (1) in certain cases.

In the illustrative embodiment depicted in FIG. 2, the layer arrangement (1) is arranged on a glass pane (5). The glass pane (5) may be a single glass pane which covers an opening in a building or vehicle. However, it may also advantageously be a glass pane comprising a plurality of glass panes of which an insulating glass pane is composed. The layer arrangement (1) is in such cases advantageously arranged on an inside of the outer glass pane, facing the incident light, of the insulating glass pane, since this outer glass pane is in thermal contact with the outside temperature and, in the case of intense incidence of light and high outside temperatures, favours a rapid switching action of the switching layer (2) between the two polarisation layers (3a) and (3b). If the layer arrangement (1) is arranged on a glass pane facing the interior, the switching layer (2) will crucially influence the incident light depending on the interior temperature, so that the temperature-dependent shading is dominated by the interior temperature and not by the outside temperature. In a sequence of three or more glass panes, the layer arrangement (1) may also be arranged on inside glass panes on a surface facing or facing away from the incident light. Furthermore, it is possible for the purposes of the present invention for the glass layer to be replaced by any desired other transparent support layer, for example a plastic layer.

Figure 4:
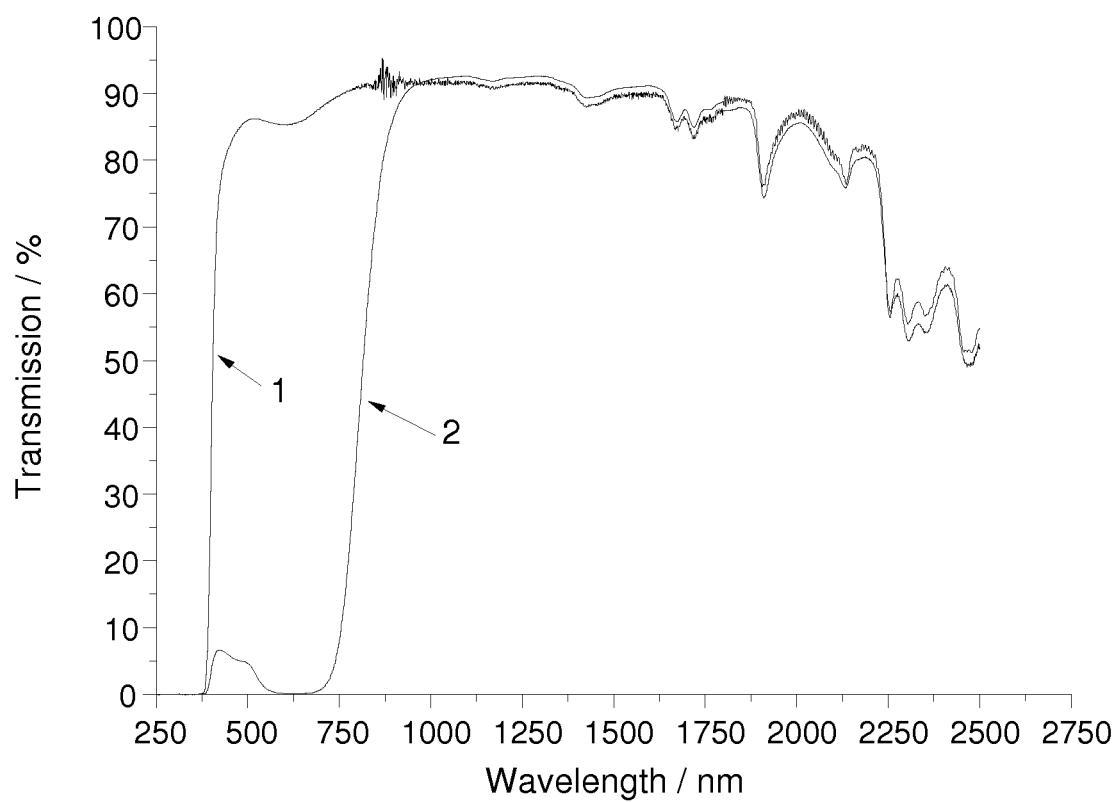

Commercially available polarisation layers (3a) and (3b) have, for example, transmission properties in accordance with the measurement values shown by way of example in FIG. 4. The two measurement curves represent conventional transmission properties of absorbent polarisation layers on measurement with linearly polarised light. Similar results are obtained for reflective polarisation layers. While the polarisation layers (3a) and (3b) only allow about half of the light to pass through in a region between 400 nm and about 800 nm in the case of unpolarised light, namely the proportion having a plane of polarisation prespecified by the polarisation layer (3a) or (3b), the efficiency at higher wavelengths, in particular in the NIR region, is low. The measurement values deviating from ideal values such as, for example, 100% transmission are attributable to edge effects and impairments of ideally 100% transmission of a layer which are unavoidable in practice.

Figure 3:
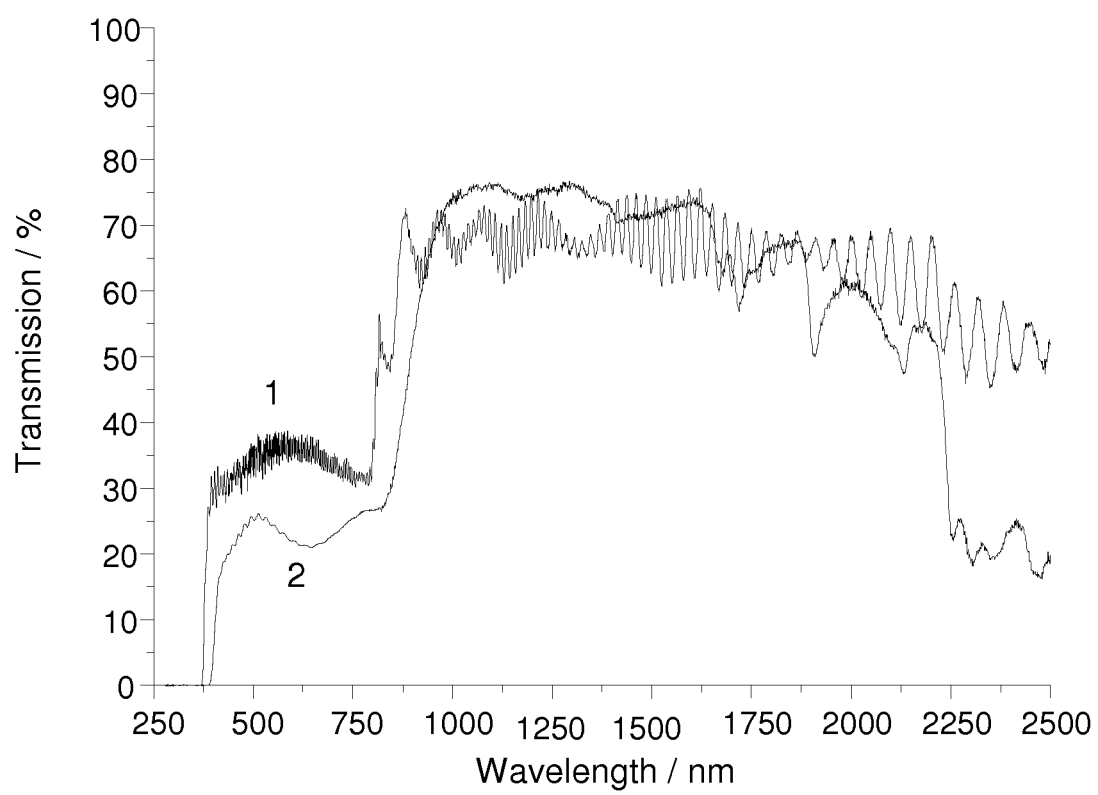

It furthermore becomes clear from the measurement results from FIG. 3 obtained with absorptive or reflective polarisers in combination with a twisted nematic liquid-crystalline layer that two polarisation layers (3a) and (3b) having planes of polarisation which are rotated through 90° with respect to one another only polarise incident light having wavelengths above about 800 nm to a small extent, meaning that the device in accordance with FIG. 3 can only exert a slight switching effect on light having a wavelength above the said 800 nm.

This is explained by the measurement results shown in FIG. 4. A polarisation layer such as (3a) and (3b) in FIG. 4 exhibits the desired effect for polarised light which has been polarised using a Glan-Thompson prism and has virtually ideal polarisation properties over the entire relevant wavelength range, for wavelengths below about 800 nm, meaning that the incident light is either blocked or substantially allowed to pass through, depending on the polarisation. By contrast, however, virtually no polarisation of the incident light occurs for wavelengths above about 800 nm, in particular for wavelengths in the NIR region.

According to the action principle depicted above of the layer arrangement, in particular the switching layer, an arrangement of a switching layer (2) between two polarisation layers (3a) and (3b) which is known from the prior art therefore has virtually no switching effect in the NIR region.

No currently commercially available polarisation layers are known which have suitable polarisation properties over the entire relevant wavelength range between about 250 nm and 1500 nm and facilitate the desired switching effect on the transmission over the entire relevant wavelength range for a layer arrangement as is known from the prior art. In particular, polarisation layers of this type are currently not technically achievable for layer arrangements which are to have surface areas larger than a few square centimeters.

In order to enable inexpensive production of a layer arrangement (1) which has the desired properties not only in the VIS region, but also, in particular, in the NIR region, the two polarisation layers (3a) and (3b) surrounding the switching layer (2) are, in accordance with the invention, combined with a layer (4) which has NIR transmission-preventing properties. Since light having wavelengths in the NIR region cannot be perceived visually, the layer (4) does not significantly impair the visually perceived incidence of light. Suitable layers (4) are already known in various compositions and with various properties and are frequently available commercially and inexpensively.

Figure 5:
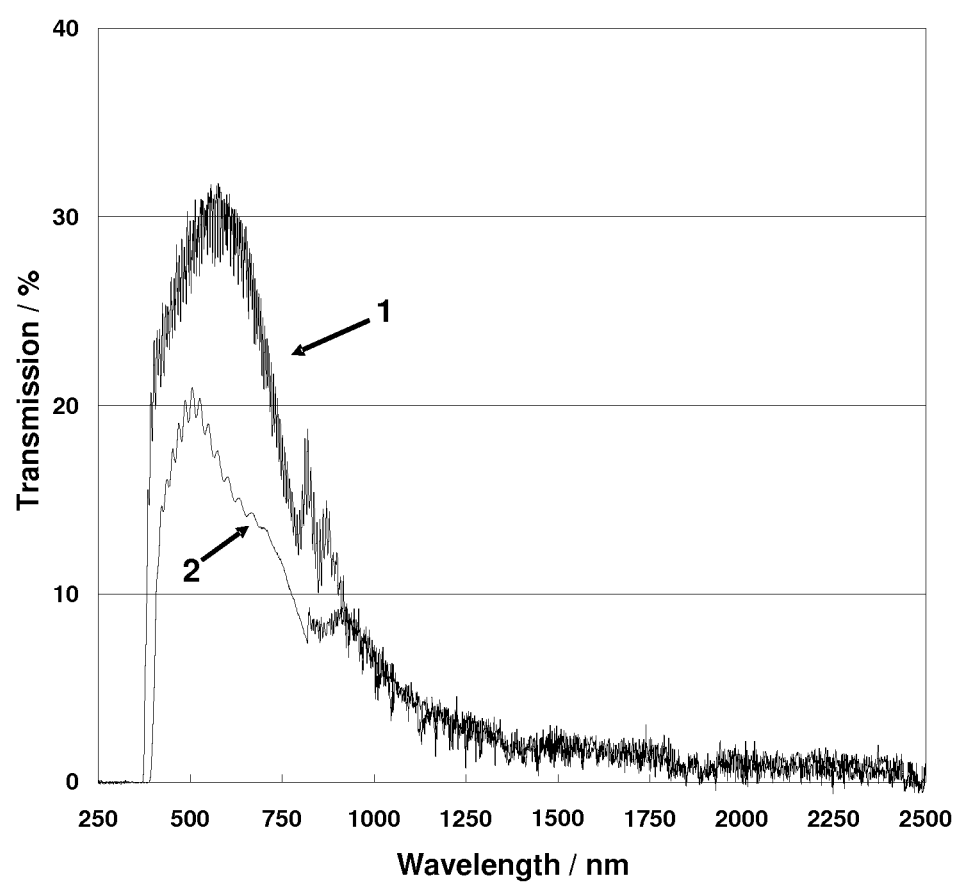

FIG. 5 shows the results of a spectral transmission measurement of a layer arrangement (1) according to the invention in the transparent state. The NIR transmission-preventing layer (4) here is a commercially available insulating glass pane having a heat-protection coating. Both in the case of reflective polarisation layers (3a) and (3b) and in the case of absorbent polarisation layers (3a) and (3b), the transmission in the VIS region is reduced to about 20% to 30% in the transparent state, while combination with the NIR transmission-preventing layer (4) causes virtually complete blockage of incident light in the NIR region. In the non-transparent state (not shown), transmission is prevented virtually completely by the polarisation layers (3a) and (3b) in combination with layer (4). Since the human eye does not have proportional, but instead logarithmic perception of light intensity, the reduction in the transmission in the VIS region to 20% to 30% that exists here in the transparent case is also still regarded as acceptable.

Figure 6:
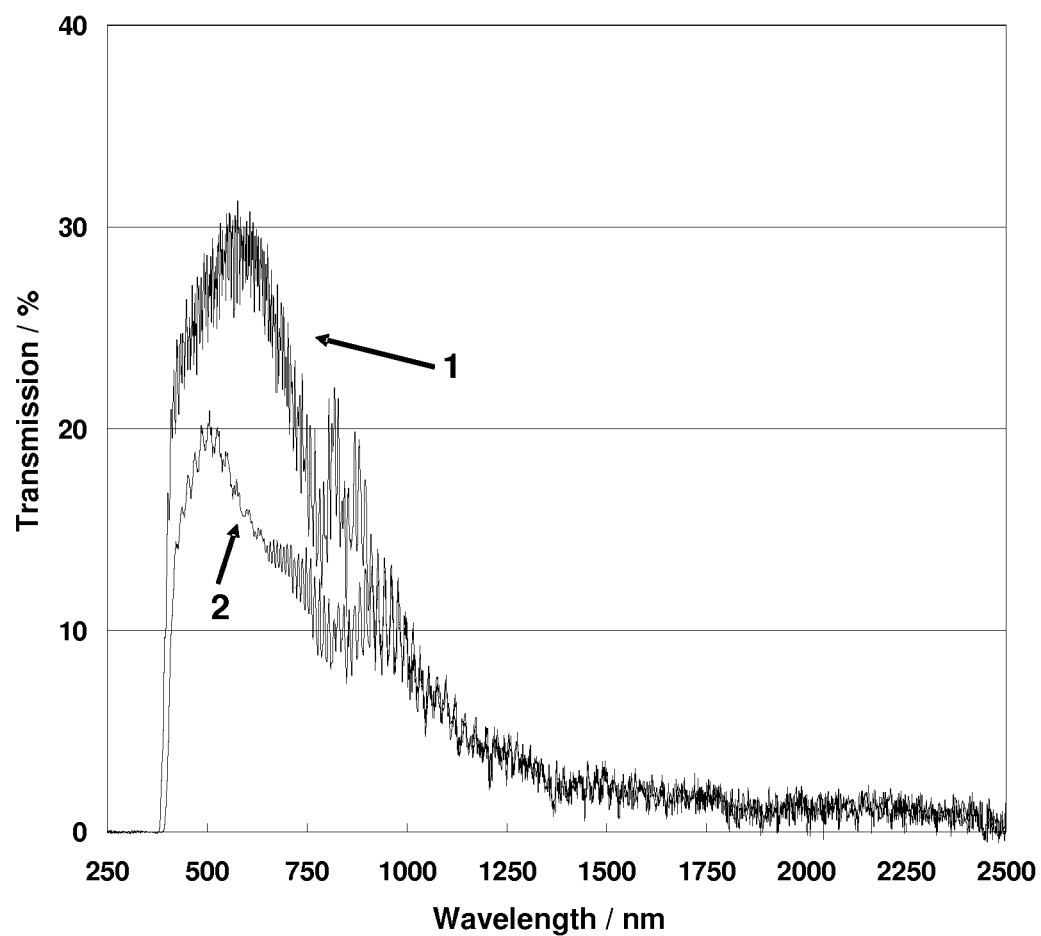

FIG. 6 shows comparable results as regards contents of a spectral transmission measurement of a layer arrangement (1) according to the invention, where the layer (4) used was a metallic foil. A metallic foil of this type is described, for example, in U.S. Pat. No. 4,973,511 and is available, for example, as metallic foil "V-Kool 70" from V-KOOL, Inc. (www.v-kool.com). This metallic foil has a transmission in the VIS region of about 70%, while the transmission in the NIR region is comparatively low. Other commercially available metallic foils may also have somewhat lower or somewhat higher transmission in the VIS region of up to 77%.

As in the measurements described above, the transmission in the VIS region is therefore reduced to about 20% to 30% both in the case of reflective polarisation layers (3a) and (3b) and in the case of absorbent polarisation layers (3a) and (3b) in the transparent state, while combination with the metallic foil causes virtually complete blockage of incident light in the NIR region. In the non-transparent state, transmission is prevented virtually completely both in the VIS region and in the NIR region by the polarisation layers (3a) and (3b) in combination with the NIR transmission-preventing layer (4).

Figure 7:
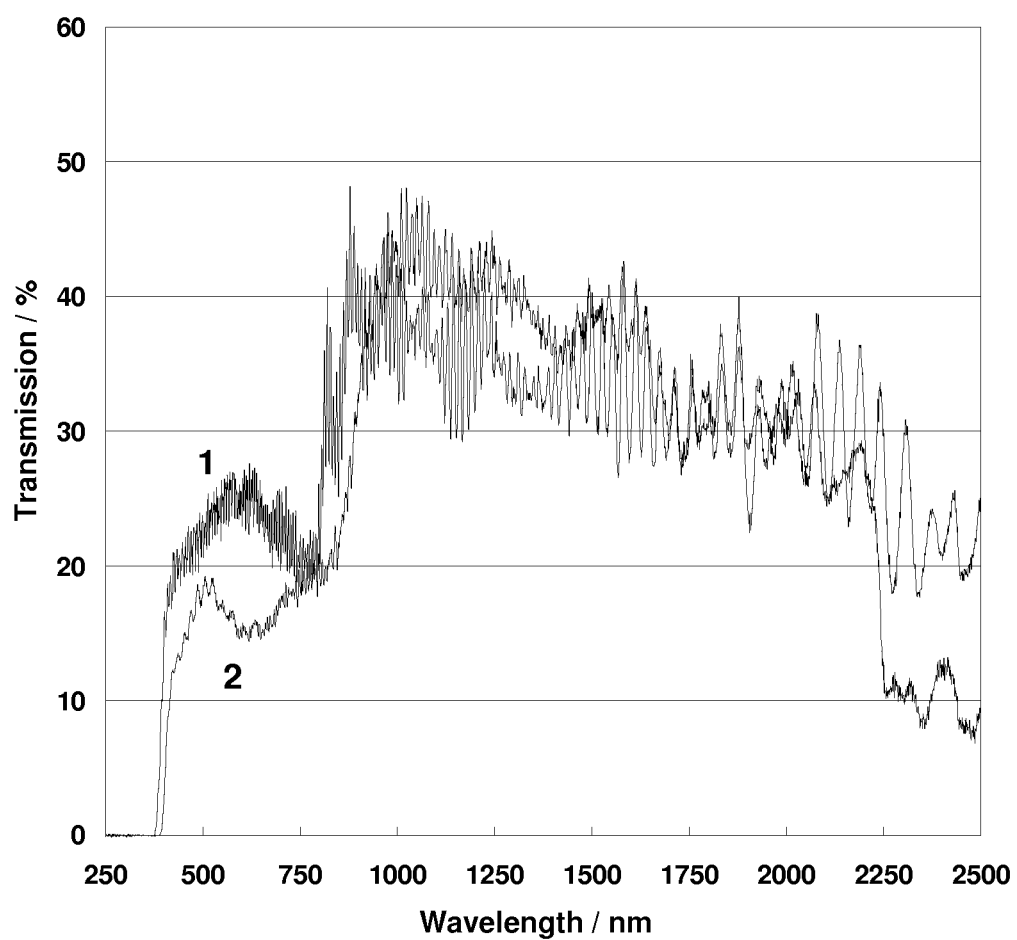

Films having ceramic constituents can also be used as NIR transmission-preventing layer (4). The transmission measurements shown by way of example in FIG. 7 were carried out using a MAC 6000 film from Madico, Inc. (www.madico.com). While the transmission for wavelengths below about 800 nm is comparable with the transmission of the layers (4) described above, the transmission above about 800 nm is reduced less, but is significantly less than 50% over the entire relevant wavelength range, which represents a considerable reduction in incident heat radiation in the NIR region compared with an arrangement of layers without layer (4).

It is also possible to use films or foils which have a multi-layer coating as NIR transmission-preventing layer (4). A layer (4) of this type can essentially consist of an NIR-reflective film or foil having a multilayered structure, where the individual layers typically consist of at least two materials having a different refractive index.

Figure 8:
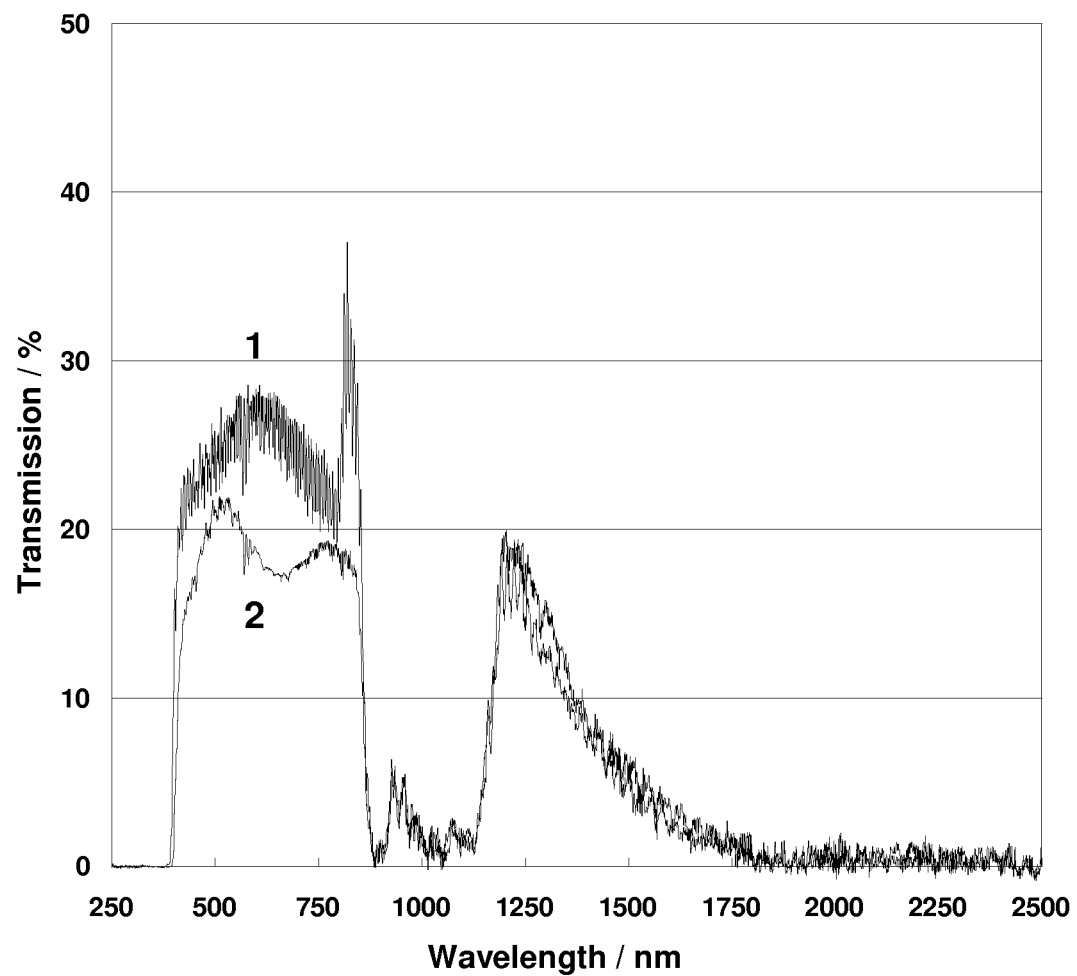

FIG. 8 shows the results of spectral measurements of the transmission properties of a layer arrangement (1) according to the invention using an NIR reflection film (3M Prestige 70 solar protection film) as NIR transmission-preventing layer, where the measurements were in each case carried out in the transparent state of the layer arrangement. In particular in the region between 850 nm and 1150 nm, the NIR reflection film causes highly effective blocking of light passing through. From a wavelength of 1150 nm, the NIR reduction is not as great as in the 850-1150 nm region, but is nevertheless still clearly visible compared with the arrangement without NIR transmission-preventing layer (cf. FIG. 3).

Figure 9:
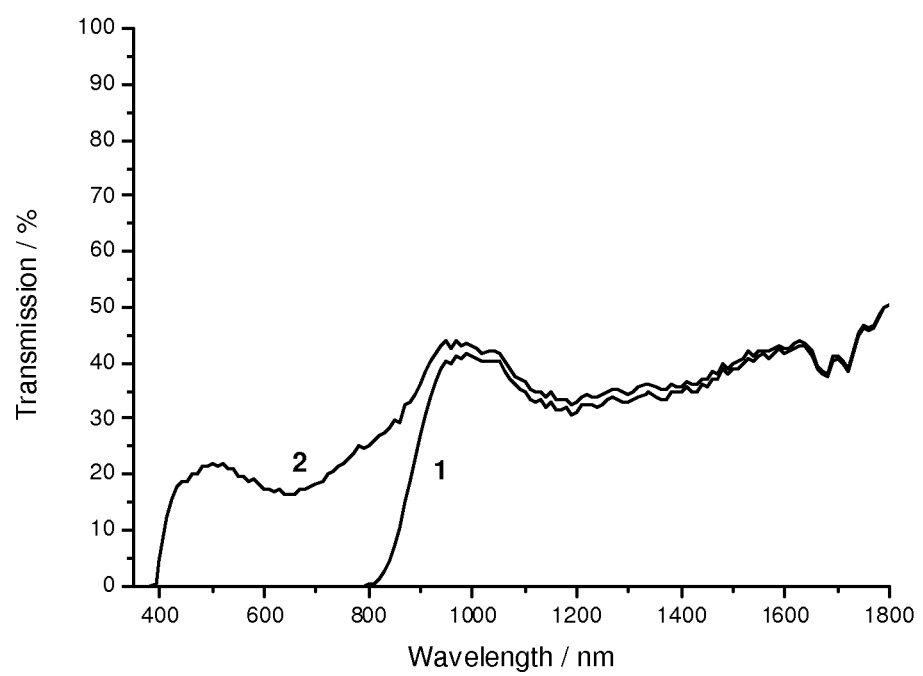
FIG. 9 shows a diagram for spectral measurements of the transmission properties of a layer arrangement according to the invention which comprises a NIR polarizer as a NIR transmission-preventing layer. The spectrum labelled 1 corresponds to the non-transparent state of the device, and the spectrum labelled 2 corresponds to the transparent state of the device.

FIG. 9 shows the results of spectral measurements of the transmission properties in the transparent (line 2) and in the non-transparent state (line 1) for a layer arrangement according to the invention having a NIR polarizing foil as a NIR transmission-preventing layer. The setup of the layer arrangement is as follows: first polarization layer—switching layer—second polarization layer, with the NIR polarizing foil being positioned either between the switching layer and one of the polarizing layers or on the outer side on one of the polarizing layers. The NIR polarizing foil used is the one disclosed in U.S. Pat. No. 5,882,774 A. With the layer arrangement according to FIG. 9, the overall transmission in the NIR range is considerably reduced, both in the transparent and in the non-transparent state.

The measurements in FIGS. 3 to 8 were carried out at room temperature (20° C.) using a Perkin Elmer Lambda 1050 UV/VIS/NIR spectrometer.

The invention claimed is:

1. Layer arrangement which changes the transmission of incident light depending on its temperature, where the layer arrangement comprises a first polarisation layer (3a), a switching layer (2) which influences the polarisation properties of light depending on the temperature, a second polarisation layer (3b), at least one NIR transmission-preventing layer (4) and a glass sheet or acrylic glass sheet as substrate layer (5), wherein the layers are arranged in the order of the first polarisation layer (3a), the switching layer (2), the second polarisation layer (3b), the at least one NIR transmission-preventing layer (4) and then the substrate layer (5) and wherein the switching layer comprises a liquid-crystalline medium which forms a nematic phase in a first temperature range and forms an isotropic phase in a second temperature range.

2. Layer arrangement according to claim 1, wherein the switching layer of the layer arrangement is a twisted nematic liquid-crystalline layer.

3. Layer arrangement according to claim 1, wherein the reduction in the transmission in the transparent state by the layer arrangement in the NIR region is greater by a factor of more than 2 than the reduction in the transmission in the VIS region.

4. Layer arrangement according to claim 1, wherein the NIR transmission-preventing layer (4) comprises at least one layer comprising a cholesteric liquid-crystal material.

5. Layer arrangement according to claim 1, wherein the NIR transmission-preventing layer (4) comprises at least one layer comprising a ceramic material.

6. Layer arrangement according to claim 1, wherein the NIR transmission-preventing layer (4) comprises at least one layer comprising a metallic material.

7. Layer arrangement according to claim 6, wherein the NIR transmission-preventing layer (4) consists of a sequence of three to five metal-oxide layers and metal layers arranged alternately.

8. Layer arrangement according to claim 1, wherein the NIR transmission-preventing layer (4) comprises at least one layer comprising a dye.

9. Layer arrangement according to claim 1, wherein the NIR transmission-preventing layer (4) comprises a combination of a layer comprising a metallic material with a layer comprising a dye.

10. Layer arrangement according to claim 1, wherein the NIR transmission-preventing layer (4) consists of an NIR-reflective film or foil having a multilayered structure, where the individual layers consist of at least two materials having different refractive index.

11. Layer arrangement according to claim 1, wherein the NIR transmission-preventing layer (4) has been applied with the aid of a thin-film process or a printing process.

12. Layer arrangement according to claim 1, wherein the NIR transmission-preventing layer (4) has been applied by sputtering or pyrolytic spraying.

13. Layer arrangement according to claim 1, wherein the NIR transmission-preventing layer (4) has been applied by thermal vapour deposition.

14. Layer arrangement according to claim 1, wherein the reduction in the transmission in the transparent state by the layer arrangement in the NIR region is greater by a factor of more than 2.08 than the reduction in the transmission in the VIS region.

15. Layer arrangement according to claim 1, wherein the reduction in the transmission in the transparent state by the layer arrangement in the NIR region is greater by a factor of more than 2.2 than the reduction in the transmission in the VIS region.

16. Layer arrangement according to claim 1, wherein the reduction in the transmission in the transparent state by the layer arrangement in the NIR region is greater by a factor of more than 2.3 than the reduction in the transmission in the VIS region.

17. Layer arrangement according to claim 1, wherein the NIR transmission-preventing layer with the substrate layer thereon are on the outside of the layer arrangement facing the direction from which the incident light comes.

* * * * *